(No Model.)
K. HOEKSTRA.
LIFE SAVING APPARATUS.
No. 530,525.
Patented Dec. 11. 1894.
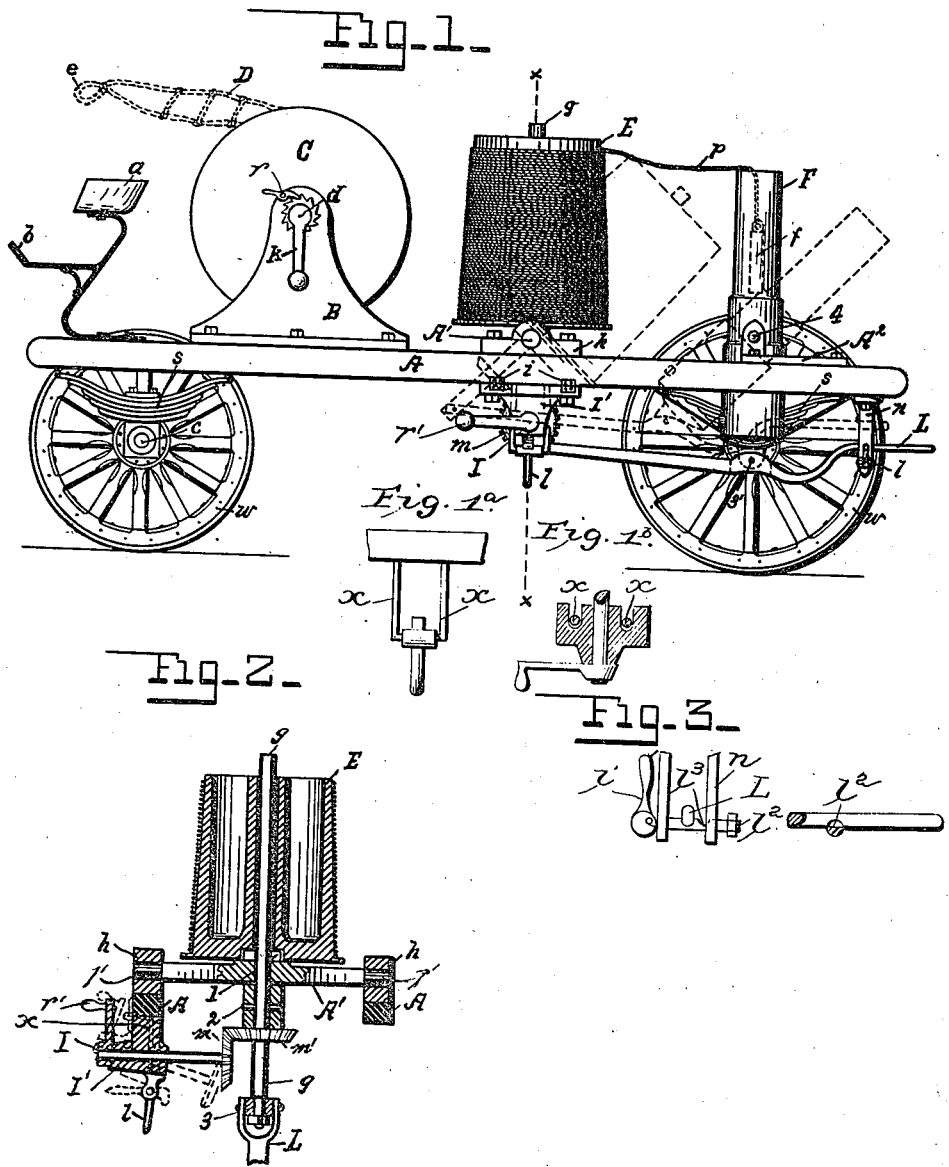
Witnesses
F. M. Metcalf
E. C. Bacon
Inventor
Klaas Hoekstra
By Martin Metcalf
Atty

UNITED STATES PATENT OFFICE.

KLAAS HOEKSTRA, OF BATTLE CREEK, MICHIGAN.

LIFE-SAVING APPARATUS.

SPECIFICATION forming part of Letters Patent No. 530,525, dated December 11, 1894.

Application filed February 13, 1894. Serial No. 499,999. (No model.)

*To all whom it may concern:*

Be it known that I, KLAAS HOEKSTRA, a citizen of the United States, residing at Battle Creek, in the county of Calhoun and State of Michigan, have invented certain new and useful Improvements in Life-Saving Apparatus; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention comprises the combination in a single movable implement, of a truck on which is mounted a flexible ladder, a line for engagement therewith, a gun, or projectile thrower, provided with a suitable projectile for attachment to said line and engagement, for the purposes set forth and hereinafter more particularly illustrated and described.

In the drawings, forming part of the said specification, and wherein letters and numerals are employed, the same refer to similar parts in all the views.

Figure 1, represents a side elevation of my invention, having the two truck-wheels on the near side thereof removed; the better to show the operative parts of this novel and useful invention; a careful scrutiny of which, by those skilled in the arts to which the invention pertains, will convey a pretty clear conception of its plan and mode of operation. Figs. 1ª and 1ᵇ are detail views. Fig. 2, is a transverse vertical section, drawn on line $x, x$, of Fig. 1. Fig. 3, represents details relating to locking means for holding the line drum and cannon in position.

Referring now to the several parts—A, represents the truck-frame, provided with axles $c$ and wheels $w$, for ready road-way propulsion by means of any of the well known methods. Rising from the upper surface of the frame A, are the driver's seat $a$, and foot rest $b$; and adjacently rearward rise the fixed standards B, one on each upper surface of said frame; and near the top of said standards the shaft $d$, of the ladder reel C, is journaled, the near end of said shaft being provided with the crank K, while a dog and ratchet $r$, fixed to said standard and shaft, respectively, serve to securely lock the shaft and reel C, at any desired position.

D, represents the rope ladder, coiled around the reel C, the outermost portion of which is seen having at its extremity a loop $e$. Located suitably in rear of the reel C, is the line drum E, provided with a vertical shaft $g$, fixed thereto, which passes through a bearing in a transverse rock shaft A' journaled in boxes $h$, bolted to the top side of the frame A, on each side thereof. The shaft is held in said bearing against vertical displacement by the collar 1. Located in line vertically with said vertical shaft $g$, but at right angles thereto, and below the frame A, and swinging outwardly, is the bearing box I', secured to the under side of the frame A, by means of hinges $i$, in which swinging box is journaled the short transverse shaft I, having a crank $r'$, fixed to its outermost end, and a bevel gear wheel $m$, on its inner extremity; which latter gear-wheel intermeshes, at certain times, with a like gear-wheel fixed to the drum shaft $g$, immediately below the transverse bar A', by means of a pin 2. The locking or eccentric lever $l$, situated directly below the short shaft bearing box I', at this point, serves to force said box and shaft I, up in a yoke $x$ shown in Figs. 1ª, 1ᵇ and in dotted lines Fig. 2 and depending from the side bar of the frame A, at this point, or said short shaft I, may be dropped down, so as to throw the bevel gear wheels into, or out of mesh, as seen, (Fig. 2,) by throwing the locking lever $l$ out of locking position as in dotted lines, Fig. 2.

Located centrally of the frame A, and approximately in line longitudinally and transversely, with the bearings of the vertical drum E, between the rear wheels $w$, of the truck and frame A, is the gun barrel, or projectile thrower F, having a bore to which is fitted the projectile $f$, to the uppermost extremity of which is to be attached the flexible line P, while the opposite extremity of said line is fixed to the base of the drum E, and the intermediate portion of said line winds around said drum, in normal position, as shown.

As will be seen, the arm, or longitudinal lever L, attaching by a swivel joint 3, to the lowermost extremity of the drum shaft g, reaches rearward to a point exactly underneath the bearings 4, of the gun barrel F, where it pivotally engages the extreme lowermost central point of the gun barrel breech, thence recurving upward and longitudinally, engages with, and is adjustably held by, the locking devices located at the central, rearward point of the truck. This locking device as shown in Fig. 3, comprises a bolt $l^2$ engaging a notch in the under edge of the lever L so that the said lever cannot be given its initial movement forwardly, until the sliding bolt is moved laterally of the lever to bring the notch $l^3$ therein under the lever when said lever may be thrust forwardly. The sliding bolt is operated by the cam lever $l'$. The sliding bolt and cam lever are supported by the brackets n.

The mode of operation of my novel invention is as follows:

The line is first wound around the drum and the ladder also put in normal place by means of the cranks r and $r'$, respectively,— the gun barrel charged and the projectile f, properly attached to the line P, and placed in said barrel F, as shown in Fig. 1, of the drawings. The locking, or eccentric levers l, $l'$, are now thrown to a horizontal position, by which means the short shaft $I'$ is released, and by gravity of the wheel m, on its inner end, said shaft drops down and its wheel is thrown out of mesh with its mate $m'$ as shown by dotted lines; and the operator, taking hold of the rearwardly projecting end of the longitudinal arm, and lever L, forces the same forward, until the engagements of said lever at 3, and $3'$ shall swing the drum and gun barrels to such desired angle as may be deemed best suited to throw the projectile, with its attached line, into, or over a burning building, or vessel at sea, as the case may be, where it may be secured until the loop of the ladder may be attached and the latter drawn to a required fastening; when the crank and ratchet k, r, of the drum shaft d, are employed to firmly secure the truck extremity of said ladder, whereby a ready and effective means of escape from peril of fire is secured.

For the purpose of insuring the perfect uncoiling of the line P, where a very great length and velocity of propulsion is needed—as over and beyond a vessel at sea—I purpose using a guide, in connection with the line drum E, but for all ordinary purposes, such as fire escapes, from ordinary buildings, I do not deem further elucidation necessary.

Having thus clearly and fully described and illustrated my invention and pointed out its mode of operation, so that those skilled in the art to which it appertains may make and use the same, what I claim, and desire to secure by Letters Patent of the United States, is—

1. In a life saving apparatus, a truck, a pivoted line drum, a pivoted gun barrel and a connection between the two, substantially as described.

2. In a life saving apparatus, a truck, a pivoted line drum, a pivoted gun barrel and an operating connection between the two for tilting them on their pivots in unison, substantially as described.

3. In a life saving apparatus, a truck, a pivoted and rotating line drum, a pivoted gun barrel connected to the line drum, and a detachable winding connection between the drum and frame, substantially as described.

In testimony whereof I affix my signature in presence of two witnesses.

KLAAS HOEKSTRA.

Witnesses:
WILLIAM J. GARFIELD,
OSCAR C. ISMOND.